Patented Dec. 3, 1935

2,023,271

UNITED STATES PATENT OFFICE 2,023,271

PROCESSES FOR REDUCTION OF CONTAMINATION IN SOLUTIONS

Albert H. Hooker, Lewiston, N. Y., assignor to Hooker Electrochemical Company, New York, N. Y., a corporation of New York No Drawing. Application September 18, 1933, Serial No. 689,955

20 Claims. (Cl. 23—184)

My invention relates to a process for reduction of contamination, as by iron and the like, in aqueous solutions such as solutions of caustic alkalies and more particularly of caustic soda.

Commercial caustic soda, whether made by the electrolytic or ammonia-soda process, is produced in solutions containing 7 to 10 per cent of NaOH, which must be concentrated for removal of excess NaCl or $Na_2CO_3$, as the case may be, also for reduction of weight for economical shipment. This is commonly carried out in vacuum evaporators, the resulting solution containing about 50% NaOH, with small quantities of NaCl, $Na_2CO_3$, $Na_2SO_4$, etc. and traces of iron. This solution may be further concentrated in fusion pots and sold as anhydrous caustic soda; but a considerable proportion of the product is now sold as a solution containing 48 to 52% NaOH by weight, substantially as it comes from the evaporators. The iron in this solution is picked up all along the process, but probably mostly in the evaporators where the solution is fairly hot and concentrated. At this stage, the iron content may be of the order of 200 parts per million of NaOH. This, of course, amounts to only a minute trace; nevertheless even this small quantity is considered highly objectionable by certain industries that are large users of caustic soda, such as the cellulose industries, on account of the catalytic influence of iron and its propensity to cause discoloration.

It is known that in solutions of caustic soda below a certain critical concentration, which is probably about 40%, the iron exists in the form of its hydroxides, which may be in part flocculent and easily filterable. In solutions above this critical concentration the characteristic reddish color of ferric iron is entirely absent even after the addition of a powerful oxidizing agent, such as sodium hypochlorite. Upon diluting and standing, however, the characteristic color of ferric hydroxide may be observed. It is generally believed that in strong caustic solutions the iron exists as sodium-iron compounds, such as $Na_2Fe_2O_4$. These are soluble in the caustic solution and very difficult to remove.

It is known that the soluble iron in 50% caustic soda solutions may be reduced by prolonged aging in contact with air, even in iron tanks. This, however, necessitates a large investment in aging tanks and in inventory of product.

I have discovered that it is possible to remove the objectionable iron by merely bubbling air through the solution and filtering. The air automatically agitates the solution and thus makes contact with every part of it. By this means the soluble iron content may be reduced in a few days to a lower point than in as many weeks by the aging process.

The following figures, taken from a full commercial scale operation, will demonstrate the effectiveness of this process for reduction of iron contamination in caustic soda solutions:

In this test a large tank-full of 50% caustic solution as it came from the evaporators was subjected to my air bubbling treatment for four days. Samples were taken off, filtered and analyzed for iron at intervals of twenty-four hours. The soluble iron content per million parts of NaOH for each day was as follows:

First day (before treatment) _____ 132
Second day _____ 108
Third day _____ 82
Fourth day _____ 50
Fifth day _____ 28

The latter figure is perfectly satisfactory for all ordinary purposes. If desired, however, the iron content can be still further reduced by continuing the treatment longer. It will be noted that the reduction in iron content is approximately 1 part per million parts caustic soda for each hour of agitation or 24 parts per million parts of caustic soda for each 24 hours of agitation.

Whatever the explanation of the effect of aging the above figures prove that it is greatly accelerated by agitation. I find, however, that mere mechanical agitation, although effective, is less so than air agitation, from which it might be inferred that the process was one of oxidation. At variance with this is the fact that agitation with pure oxygen is less effective than agitation with air, and totally ineffective if the solution has been rendered sparkling by previous filtration. Agitation of a filtered solution with air is ineffective at first; but after a time cloudiness begins to appear in the solution, corresponding to formation of $Na_2CO_3$ and $Na_2SO_4$ by reduction of super-saturation or by reaction of the $CO_2$ and $SO_2$ of the air with the NaOH. From this time onward, the soluble iron begins to show a steady decrease. Agitation with air is more effective if the natural sludge, consisting mostly of sodium carbonate, is left in the solution during agitation. This would seem to show that contact with sodium carbonate and perhaps also sodium sulphate is important. It may well be that any finely divided salt would serve the same purpose. Mere mechanical agitation of a sparkling filtered solution without contact with either air or sludge, as in a closed container, is totally ineffective (except when the solution is initially super-saturated with respect to NaCl, $Na_2CO_3$, etc.). In other words, contact with either air or sludge appears to be necessary and the best results are obtained when both are present. All these facts taken together would seem to indicate that the process is one of adsorption or chemical combination or both, sodium carbonate or sulphate being the principal removal agents, especially the former, and the operation being facilitated by a preliminary oxidation of ferrous to ferric iron. As some of the iron is, nearly always, in the ferric state, mechanical agitation, in the presence of the sludge, will remove some of the iron. For best results, however, the contaminants should be as completely oxidized as practicable. To accelerate oxidation, the solution may be treated with oxygen or chlorine, sodium hypochlorite or any other suitable oxidizing agent.

Since sodium carbonate is one of the chief removal agents, increase in the quantity of sodium carbonate present, within reasonable limits, might be expected to accelerate removal of iron and such is the case. Thus, the rate of iron reduction is increased if $CO_2$ is mixed with the air or oxygen. This would appear to indicate that salts freshly formed in the solution are more active than those in the sludge. (It should be observed that the sodium carbonate in the natural sludge is in a precipitated, but not in a freshly precipitated form.)

It should be noted that caustic soda solutions coming from the evaporators are super-saturated with respect to NaCl, $Na_2CO_3$ and $Na_2SO_4$ and may still be super-saturated after cooling and filtering. Even though filtration should leave the super-saturated solution clear and sparkling, upon standing turbidity will reappear, due to excess NaCl, $Na_2CO_3$ and $Na_2SO_4$ thrown out of solution. Since agitation of the super-saturated solution aids in throwing out these salts, such solutions may be treated by mechanical agitation alone; nevertheless, for reasons already given, air agitation is much more effective than mechanical agitation, which is, generally speaking, unnecessary.

Naturally, the more vigorous the reagents, the more rapid the effect. As already shown, air is very effective in removing iron, but requires several days. The other reagents mentioned, although costing more, may if desired, be used in order to shorten the time to a few hours.

My process may be used with caustic soda solutions ranging from 40% to 60%. With solutions below 40%, my process is ineffective, probably because of change in the form in which the iron occurs. However, this is below the ordinary range of commercial solutions. Above 60% it is necessary to work above 50° C. in order to maintain the solution in liquid form. At these temperatures my process is ineffective and, if carried out in iron, may result in an increase instead of a decrease in the iron content of the solution, owing to attack upon the apparatus by the caustic soda at these temperatures. The practical limits of concentration within which my process may be effectively carried out are therefore about 42% to 54% caustic soda. The corresponding minimum temperatures which provide a reasonable margin above the solidification point at these two limits of concentration are 15° C. and 35° C. respectively. The latter temperature happens also to be the practical upper limit of temperature at which my process may be effectively carried out on a commercial scale, especially in iron.

The cellulose industries above referred to require that the caustic be low not only in iron, but in NaCl as well; and it has of late begun to be realized that $Na_2CO_3$ is likewise an undesirable contaminant, as it reacts with the acid in which the delicate rayon threads are hardened and tends to break these threads. It happens that the solubility of $Na_2CO_3$ in caustic soda solutions is at a minimum when the NaOH concentration is at about 50% and the temperature at about 20° C. This is equally true of NaCl and $Na_2SO_4$. By the process of joint patent to Hooker and Marsh, No. 1,733,879, it is possible to produce 50% solution of caustic soda containing 4,500 parts NaCl, 900 parts $NaCO_3$, 40 parts $Na_2SO_4$ and 40 parts iron per million parts of NaOH. In order to still further reduce the iron, it has been customary to pass this solution through the fusion pots and concentrate it to anhydrous caustic soda. This greatly reduces the iron content. This fusion step is liable, however, to introduce other impurities such as manganese, from the pots. This step also increases the $Na_2CO_3$ content about six times or to about 5,400 parts per million of NaOH, through reaction of the hot concentrated caustic soda with the carbon dioxide of the air, sodium carbonate being more soluble in fused caustic soda than in 50% solution. It has therefore not been possible hitherto to produce, upon a commercial scale, caustic soda that was low at the same time in all four contaminants, namely NaCl, $Na_2CO_3$, $Na_2SO_4$ and iron. By combination of my present process with that of my patent above referred to, this now becomes possible. For this purpose, I may interpose the process of the present invention between the usual evaporation step and the process of my above mentioned patent. In this way the process of the patent referred to starts with a caustic solution already low in iron. This process consists in recrystallizing out about half the NaOH, the crystals being entirely free from all three of the contaminants in question, but wet with 10% of the mother liquor in which the proportion of contaminants has been doubled. After separating out the crystals, a product is obtained containing about one-fifth of the original proportion of the contaminants. Thus, if the contaminants have been previously reduced by the process of the present invention to say 30 parts of iron, 21,000 parts NaCl and 4,000 parts $Na_2CO_3$ per million parts of caustic, then after treatment by the process of the patent referred to a product will be obtained containing only 6 parts of iron per million parts of caustic and at the same time, 4,200 parts of NaCl and 800 parts of $Na_2CO_3$.

If preferred, the process of my patent above referred to may be proceeded with in the usual way and the mother liquor may then be washed out of the crystals by means of solution in which the contaminants have been previously reduced by my present process. Since the crystals are wet with 10% of mother liquor in which the contaminants have been concentrated to twice the original proportions, by washing the crystal with solution in which the contaminants have not been concentrated, the proportion of contaminant may be still further reduced by one half. In this way I may obtain a product containing only 2,100 parts NaCl, 400 parts $Na_2CO_3$, and 3 parts of iron per million parts of NaOH, which constitutes a new article of commerce of hitherto unapproachable purity.

If, instead of washing the crystals, I melt one half of them, the remaining crystals containing no contaminants, will be wet with 10% of high purity liquor consisting of the melted crystals. If these crystals are those produced in accordance with the process of the preceding paragraph, I may obtain in this way a product containing only 210 parts NaCl, 40 parts $Na_2CO_3$ and 0.3 part iron per million parts of NaOH.

It will be obvious that in the case of caustic potash, potassium carbonate would be found in the sludge and would behave in the manner described.

In the following claims, "clarifying" is to be understood as the equivalent of any of the well known means for removing suspended solids from liquids, such as allowing the solids to settle and decanting off the liquid, or filtering or centrifuging.

What I claim is:

1. The process of reducing contamination by iron in 42 to 54 percent commercial caustic soda solutions which comprises agitating the solution in contact with finely divided sodium carbonate not less than 24 hours, at a temperature between 15° C. and 35° C., and clarifying.

2. The process of reducing contamination by iron in 42 to 54 percent commercial caustic soda solutions initially super-saturated with respect to the combined solubility of caustic soda, sodium chloride, sodium sulphate and sodium carbonate which comprises agitating the solution not less than 24 hours, at a temperature between 15° C. and 35° C., and clarifying.

3. The process of reducing contamination by iron in 42 to 54 percent commercial caustic soda solutions which comprises agitating the solution in contact with salts including sodium carbonate precipitated from said solution not less than 24 hours, at a temperature between 15° C. and 35° C., and clarifying.

4. The process of reducing contamination by iron in 42 to 54 percent commercial caustic soda solutions which comprises agitating the solution in contact with sodium carbonate freshly formed and precipitated in the solution, not less than 24 hours, at a temperature between 15° C. and 35° C., and clarifying.

5. The process of reducing contamination by iron in 42 to 54 percent commercial caustic soda solutions which comprises introducing carbon dioxide and agitating the solution in contact with the carbonate so formed not less than 24 hours, at a temperature between 15° C. and 35° C., and clarifying.

6. The process of reducing contamination by iron in 42 to 54 percent commercial caustic soda solutions which comprises bubbling oxygen and carbon dioxide through the solution not less than 24 hours, at a temperature between 15° C. and 35° C., and clarifying.

7. The process of reducing contamination by iron in 42 to 54 percent commercial caustic soda solutions which comprises bubbling air through the solution not less than 24 hours, at a temperature between 15° C. and 35° C., and clarifying.

8. The process of reducing contamination by iron in 42 to 54 percent commercial caustic soda solutions which comprises treating the solution with oxidizing and carbonating agents, agitating it in contact with salt precipitated from said solution not less than 24 hours, at a temperature between 15° C. and 35° C., and clarifying.

9. The process of reducing contamination by iron in 42 to 54 percent caustic soda solutions that have been concentrated by evaporation from solutions initially saturated with respect to the combined solubility of caustic soda, the salts from which it was originally formed and any other salts associated therewith or present as contaminants, and allowed to cool, which comprises agitating the solution in contact with its own natural sludge not less than 24 hours, at a temperature between 15° C. and 35° C., and clarifying.

10. The process of reducing contamination by iron in 42 to 54 percent caustic soda solutions that have been concentrated by evaporation from solutions initially saturated with respect to the combined solubility of caustic soda, the salts from which it was originally formed and any other salts associated therewith or present as contaminants, and allowed to cool, which comprises bubbling air through the solution in contact with its own natural sludge not less than 24 hours, at a temperature between 15° C. and 35° C., and clarifying.

11. The process of reducing contamination by iron in 42 to 54 percent caustic soda solutions that have been concentrated by evaporation from solutions initially saturated with respect to the combined solubility of caustic soda, the salts from which it was originally formed and any other salts associated therewith or present as contaminants, and allowed to cool, which comprises, agitating the unclarified solution at a temperature between 15° C. and 35° C. not less than 24 hours, and clarifying.

12. The process of reducing contamination by iron in unclarified 42 to 54 percent caustic soda solutions that have been concentrated by evaporation from solutions initially saturated with respect to the combined solubility of caustic soda, the salts from which it was originally formed and any other salts associated therewith or present as contaminants, and allowed to cool, which comprises maintaining its natural sludge dispersed throughout the solution at a temperature between 15° C. and 35° C. for not less than 24 hours and then clarifying the solution.

13. The process of reducing contamination by iron to less than 30 parts of iron per million parts of caustic soda in 42 to 54 percent commercial caustic soda solutions which comprises agitating the solution in contact with salts including sodium carbonate at a temperature between 15° C. and 35° C. for approximately one hour for each part of iron to be removed per million parts of caustic soda in the original solution and clarifying.

14. The process of reducing contamination by iron to less than 30 parts of iron per million parts of caustic soda in 42 to 54 percent commercial caustic soda solutions which comprises agitating the solution in contact with salts including sodium carbonate at a temperature between 15° C. and 35° C. for approximately 24 hours for each 24 parts of iron to be removed per million parts of caustic soda in the original solution and clarifying.

15. The process of producing commercial solutions containing 42 to 54 percent caustic soda and having a relatively low iron content which comprises evaporating to the stated degree of concentration caustic soda solution initially saturated with respect to the combined solubility of caustic soda, the salts from which it was originally formed and any other salts associated therewith or present as contaminants, allowing it to cool, agitating the unclarified solution not less than 24 hours at a temperature between 15° C. and 35° C. and clarifying.

16. The process of producing commercial solutions containing 42 to 54 percent caustic soda and having an iron content below 30 parts per million parts of caustic soda which comprises evaporating to the stated degree of concentration caustic soda solution initially saturated with respect to the combined solubility of caustic soda, the salts from which it was originally formed and any other salts associated therewith or present as contaminants, allowing it to cool, agitating the unclarified solution for approximately four days at a temperature between 15° C. and 35° C. and clarifying.

17. The process for the purification of 42 to 54 per cent caustic soda solutions from iron and residual salts which comprises agitating the solution in contact with salts including sodium carbonate precipitated from said solution at a temperature between approximately 15° C. and 35° C. not less than twenty-four hours, clarifying, diluting to a point at which residual salts will be held in solution when the solution is cooled to the temperature at which the caustic soda crystallizes out in a form readily separable from the solution, cooling the solution below said last mentioned temperature and separating out the crystals thus produced.

18. The process for the purification of 42 to 54 per cent caustic soda solutions from iron and residual salts which comprises agitating the solution in contact with salts including sodium carbonate precipitated from said solution at a temperature between approximately 15° C. and 35° C. not less than twenty-four hours, clarifying, diluting to a point at which the residual salts will be held in solution when the solution is cooled to a temperature at which it becomes saturated with respect to $NaOH.3\tfrac{1}{2}H_2O$, cooling the solution below said last mentioned temperature and separating out the crystals thus provided.

19. The process for the purification of 42 to 54 per cent caustic soda solutions from iron and residual salts which comprises agitating the solution in contact with salts including sodium carbonate precipitated from said solution at a temperature between approximately 15° C. and 35° C. not less than twenty-four hours clarifying, diluting to a point at which residual salts will be held in solution when the solution is cooled to the temperature at which caustic soda crystallizes out in a form readily separable from the solution, cooling the solution below said last mentioned temperature, separating out the crystals thus produced and washing said crystals with more of the solution taken from the stage immediately following the clarification step.

20. The process for the purification of 42 to 54 per cent caustic soda solutions from iron and residual salts which comprises agitating the solution in contact with salts including sodium carbonate precipitated from said solution at a temperature between approximately 15° C. and 35° C. not less than twenty-four hours, clarifying, diluting to a point at which residual salts will be held in solution when the solution is cooled to the temperature at which caustic soda crystallizes out in a form readily separable from the solution, cooling the solution below said last mentioned temperature, separating out the crystals thus produced, melting a part of said crystals and separating out the remainder.

ALBERT H. HOOKER.